US012655669B2

(12) United States Patent
Hassen

(10) Patent No.: US 12,655,669 B2
(45) Date of Patent: Jun. 16, 2026

(54) DOOR POSITIONING SYSTEM AND DOOR ASSEMBLY

(71) Applicant: Rana Hassen, Houston, TX (US)

(72) Inventor: Rana Hassen, Houston, TX (US)

( * ) Notice: Subject to any disclaimer, the term of this patent is extended or adjusted under 35 U.S.C. 154(b) by 182 days.

(21) Appl. No.: 18/806,935

(22) Filed: Aug. 16, 2024

(65) Prior Publication Data

US 2025/0059813 A1 Feb. 20, 2025

Related U.S. Application Data

(60) Provisional application No. 63/519,920, filed on Aug. 16, 2023.

(51) Int. Cl.
*E05D 15/56* (2006.01)
*E05D 15/26* (2006.01)

(52) U.S. Cl.
CPC ........... *E05D 15/56* (2013.01); *E05D 15/264* (2013.01); *E05Y 2201/684* (2013.01)

(58) Field of Classification Search
CPC . E05D 15/56; E05D 15/0621; E05D 15/0626; E05D 15/0652; E05D 15/10; E05D 15/12; E05D 15/264; E05D 15/266; E05D 2015/268; E05D 15/58; E06B 3/481; E05Y 2201/684
See application file for complete search history.

(56) References Cited

U.S. PATENT DOCUMENTS 2,860,701 A * 11/1958 Wood .................... E05D 15/266 160/199
4,295,514 A * 10/1981 Johnson ................ E05D 7/1061 16/389
4,534,395 A * 8/1985 Carroll .................. E05F 15/605 160/199
5,966,777 A 10/1999 Jantschek
6,253,393 B1 7/2001 Dries et al.
6,470,952 B1 * 10/2002 Cline .................... E05D 15/266 160/199
9,131,788 B2 9/2015 Lindblom
(Continued)

FOREIGN PATENT DOCUMENTS

AU 2005101027 C4 * 6/2009 ............... E06B 3/48
AU 2011286171 B2 * 8/2017 ............. E05D 15/26
(Continued)

*Primary Examiner* — Beth A Aubrey
(74) *Attorney, Agent, or Firm* — BRADLEY ARANT BOULT CUMMINGS LLP

(57) ABSTRACT

A door assembly for installation in a doorway includes a folding panel door with a first panel moveably attached to a second panel, an extension having a top wall, an inside edge and an outside edge parallel to a vertical axis, and an extension length between the inside edge and the outside edge, a first pivot connector to moveably attach the extension to a doorway frame with the inside edge adjacent to a first jamb, a second pivot connector to moveably attach the extension to the first panel. The door assembly has a fully open position where the extension length is generally parallel to the depth of the doorway, the first panel and the second panel are generally perpendicular to the extension length and outside of the doorway, and the extension is located between the folding panel door and the doorway.

20 Claims, 15 Drawing Sheets

(56) References Cited

U.S. PATENT DOCUMENTS

| | | | | |
|---|---|---|---|---|
| 9,382,738 | B2 | 7/2016 | Bonetti | |
| 2005/0241781 | A1* | 11/2005 | Johnson | E05F 15/51 160/199 |
| 2007/0094846 | A1 | 5/2007 | Ishida | |
| 2014/0224435 | A1* | 8/2014 | Stawski | E06B 3/486 160/192 |
| 2017/0089122 | A1* | 3/2017 | Lewis | E06B 3/481 |
| 2020/0018572 | A1* | 1/2020 | Gonzales | F41H 5/24 |
| 2020/0386024 | A1* | 12/2020 | Mitchell | E05D 7/009 |
| 2021/0396057 | A1* | 12/2021 | Spork | E05D 5/04 |
| 2022/0307304 | A1 | 9/2022 | Irgang et al. | |

FOREIGN PATENT DOCUMENTS

| | | | | |
|---|---|---|---|---|
| DE | 20010918 | U1 | 8/2000 | |
| EP | 2112312 | A2 | 10/2009 | |
| EP | 2078813 | A3 * | 3/2014 | E05F 15/10 |
| FR | 2429889 | A1 * | 1/1980 | E06B 3/481 |
| GB | 2077349 | A | 12/1981 | |
| KR | 102015421 | B1 | 8/2019 | |
| KR | 20210001696 | U | 7/2021 | |
| WO | 2007142284 | A1 | 12/2007 | |
| WO | 2020040344 | A1 | 2/2020 | |
| WO | 2021181208 | A1 | 9/2021 | |

* cited by examiner

DOOR POSITIONING SYSTEM AND DOOR ASSEMBLY

BACKGROUND

This section provides background information to facilitate a better understanding of the various aspects of the disclosure and is not an admission of prior art.

Bifold doors, currently available on the market, are extremely inefficient and somewhat cumbersome when it comes to their function. They are often noisy, inconvenient to open and close, may not open completely to provide full access, and do not operate smoothly. In fact, they in and of themselves are often an obstacle when reaching inside to the far right or left interior of a closet. That said, using a standard door for closets is often not an option, whether due to space constraints, frame depth, or safety concerns.

SUMMARY

A door assembly for installation in a doorway includes a folding panel door with a first panel moveably attached to a second panel, an extension having a top wall, an inside edge and an outside edge parallel to a vertical axis, and an extension length between the inside edge and the outside edge, a first pivot connector to moveably attach the extension to a doorway frame with the inside edge adjacent to a first jamb, a second pivot connector to moveably attach the extension to the first panel.

An example of a folding panel door includes a doorway defined by a frame, the doorway having a height between a header and a threshold and parallel to a vertical axis, a length between a first jamb and a second jamb and parallel to a longitudinal axis, the vertical axis and the longitudinal axis defining a vertical plane of the doorway between the first jamb and the second jamb, and a depth parallel to a lateral axis that is perpendicular to the vertical plane, a door assembly includes a folding panel door and an extension, the folding panel door has a first panel moveably attached to a second panel and the extension has a top wall, an inside edge and outside edge parallel to the vertical axis, and an extension length between an inside edge and an outside edge, a first pivot connector, with a first vertical pivot axis, attaches the extension to the frame with the inside edge adjacent to the first jamb, and a second pivot connector, having a second vertical pivot axis, attaches the extension to the first panel. The door assembly is moveable between a full closed position, a first open position, a second open position, and a fully open position. In the full closed position, the extension length, the first panel, and the second panel are coaxial and parallel to the vertical plane. In in the first open position, the extension length is generally parallel to the vertical plane, and the first panel and the second panel are generally perpendicular to the extension length and generally parallel to one another and to the lateral axis. In the second open position, the extension length, the first panel, and the second panel are generally parallel to the lateral axis and to each other. In the fully open position, the extension length is generally parallel to the lateral axis, the first panel and the second panel are generally perpendicular to the lateral axis and the extension length, and the extension is located between the folding panel door and the doorway.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion. As will be understood by those skilled in the art with the benefit of this disclosure, elements and arrangements of the various figures can be used together and in configurations not specifically illustrated without departing from the scope of this disclosure.

DETAILED DESCRIPTION

Figure 1:
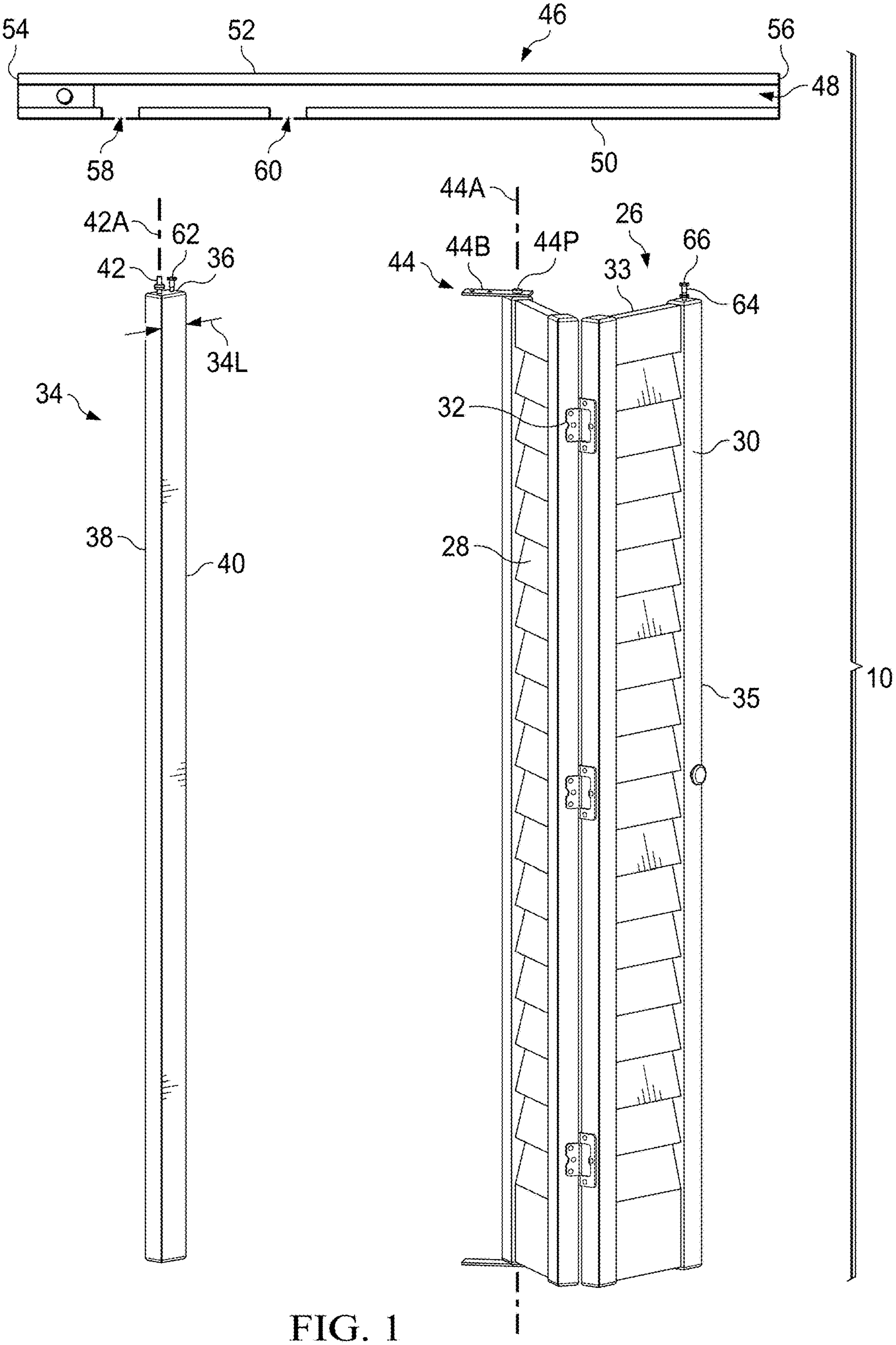
FIG. 1 illustrates an example of a door positioning system for installing a folding panel door in a doorway according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Figure 2:
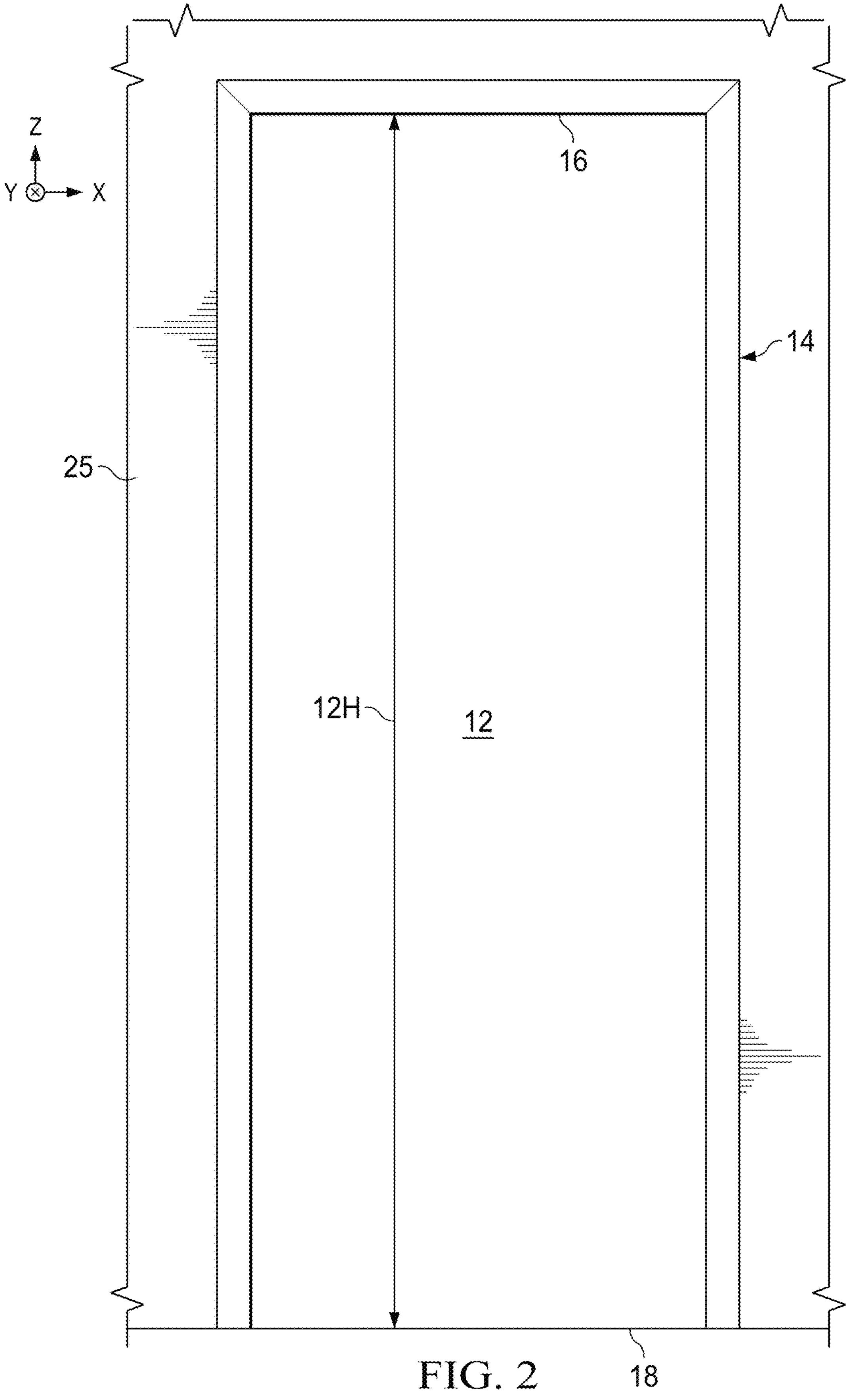
FIG. 2 illustrates a doorway defined by a frame for installing a folding door assembly according to one or more aspects of the disclosure.
Figure 3:
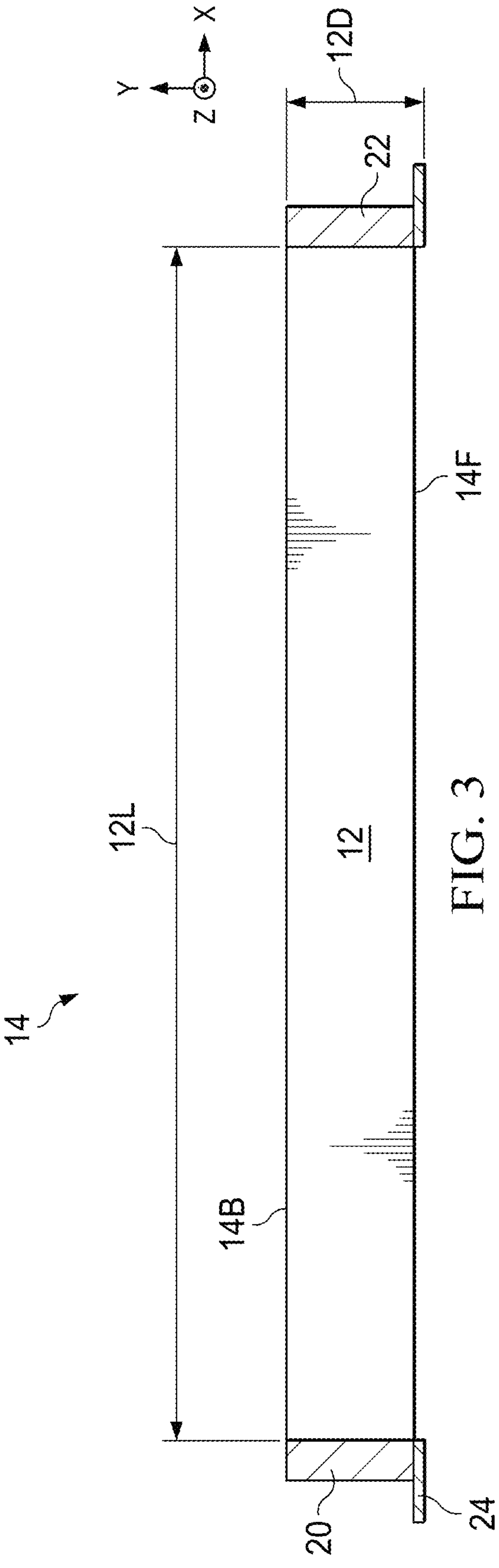
FIG. 3 is top, cut-away view of the doorway with the header removed according to one or more aspects of the disclosure.

FIGS. 1-3 illustrate an example of a door assembly, generally denoted by the numeral 10, for installation in a doorway 12. Doorway 12 may be a passage into various spaces including a living space, a closet, and a cabinet. FIGS. 4-15 illustrate example door assemblies 10 in different positions. FIGS. 4-15 are described with reference to FIGS. 1-3.

Doorway 12 is defined by a frame 14. Frame 14 is a parallelogram having a header 16, threshold 18, first jamb 20, and second jamb 22. Frame 14 may include decorative molding 24. FIGS. 2 and 3 depict three mutual orthogonal direction X, Y, and Z forming a three-dimensional frame of reference XYZ. Vertical axis Z corresponds to vertical height 12H between header 16 and threshold 18 of doorway 12. Longitudinal axis X corresponds to a length 12L of the doorway between first and second jambs 20, 22. The X-Z plane corresponds to the plane of the doorway. The Y-axis is perpendicular to the X-axis and the Z-axis and extends parallel to a depth 12D of doorway 12 and frame 14. Doorway 12 may have a front side, 14F and back side 14B, generally used with reference to closets and cabinets with the back side being inside of the enclosed space.

Door assembly 10 is used to install a folding panel door 26 in a doorway providing the ability to fully open the doorway and substantially remove the folding panel door from the doorway. For purposes of brevity, the folding panel doors are illustrated as bifold doors, having only two panels, however, the folding panel door may include more than two or panels. In some configurations the door has a single panel and is not a folding panel door.

Door assembly 10 is partially assembled in FIG. 1 and may include some or all of the hardware illustrated or described. Door assembly 10 may include additional hardware including duplicates of the hardware shown. In some embodiments, the door assembly may not include the folding panel door.

Folding panel door 26 includes a first panel 28 moveably connected to a second panel 30 for example by hinges 32. Panels 28 and 30 can be positioned coaxially to close the doorway and folded together in open positions. Hinges 32 are shown as butt hinges; however, other moveable connections can be used, including butt and top pivot hinges to allow the panels to fold in two directions.

Door assembly 10 includes an extension 34 that is moveably attached to the folding panel door. Extension 34 is positioned adjacent a door jamb and facilitates the fully opening of the doorway by moving the folded door panels to outside of and adjacent to the doorway. Extension 34 has a top wall 36, to be positioned adjacent the doorway header and a length 34L from an inside vertical edge 38 to an outside vertical edge 40. Extension length 34L is used to identify the orientation of extension 34. Extension 34 may be referred to as being narrow and the length is determined, at least in part, with depth 12D (FIG. 3) of the doorway and may be determined relative to standard door frames. Length 34L may extend for example, approximately half of depth 12D, considering any trim/molding 24 when present, to position the folding panel door in the fully open position outside of frame 14 and in the desired rotated position relative to the doorway. In a non-limiting example, a narrow vertical extension 34 may have a length of approximately 0.5 to 10 inches for a doorway. In another example, length 34L may be approximately 0.5 to 4 inches, or 0.5 to 3 inches. In another example, length 34L may be about 1 to 2.5 inches. In an embodiment, extension length 34L is less than depth 12D of the frame and doorway.

Door assembly 10 can reduce the wall space 25 needed on the outside of a doorway to position an open door in a fully open position (e.g., parallel to the plane of the doorway). For example, in some homes a doorway may be positioned close to a wall preventing a traditional door from rotating to a fully open position parallel to the doorway plane. The disclosed door assemblies facilitate using a folding panel door that can be moved to a fully open position, similar to a traditional single panel door, positioning the folding panel door along the limited wall space 25.

Door assembly 10 includes a first pivot connector 42, having a first vertical pivot axis 42A, to moveably connect extension 34 to the doorway frame with inner edge 38 adjacent to first jamb 20. Pivot axis 42A is parallel to the vertical axis. First pivot connector 42 is shown as a pin connected to top wall 36 of extension 34 and connected to the doorway header, however, other pivot connectors may be used including connectors that attach to the jamb.

Doorway assembly 10 includes a second pivot connector 44, having a second vertical pivot axis 44A, to moveably attach extension 34 to first panel 28 of the folding panel door. Connector 44 may be, for example, a pivot hinge such as a knife hinge (e.g., bracket and pin) allowing for movement in different directions or a hinge providing ninety-degree movement in one direction. Pivot axis 44A is parallel to the vertical axis. The illustrated pivot connector 44 includes a bracket 44B and rotatable pin 44P. Bracket 44B is connectable to the extension, for example, with pivot connector 42 and/or extension guide 62 holding bracket 44B to the extension and pin 44B attached to the door panel.

Door assembly 10 may also include a track 46, similar to tracks commonly used with sliding folding panel doors. Track 46 has a central slot 48 between a fore wall 50 and an aft wall 52 and extending substantially between first end 54 and second end 56. Track 46 includes a first opening 58 in fore wall 50 adjacent to track end 54 and a second open 60 on the opposite side of first opening 58 from first end 54. When installed, first opening 58 will not extend further away from the first jamb than second edge 40 of extension 34 extends away from the first jamb. Track 46 is connected to the doorway header with first end 54 adjacent to the first jamb and pivot connection 42. Fore wall 50 is oriented facing the front of the doorway and the direction to which the folding panel door is rotated out of the doorway. In some embodiments, track 46 may also have first and second openings in the aft wall so that the door can be opened toward the back for the doorway.

Door assembly 10 may include an extension guide 62 and a door guide 64 that are cooperative with track 46. Extension guide 62 and door guide 64 may have the same configuration or be different designs. Extension guide 62 is connects with top wall 36 adjacent to second edge 40. Extension guide 62 may be attached directly to extension 34 or may be included with second pivot connector 44. Extension guide 62 extends vertically above top wall 36 to pass in and out of track slot 48 through first opening 58.

Door guide 64 is to be attached to the top wall 33 of distal door panel 30 proximate the distal (relative to pivot axis 42A) edge 35 of the distal panel and is cooperative with track 46. Door guide 64 may include a head 66 configured to slide within track slot 48. Door guide 64 passes in and out of track slot 48 through second opening 60.

Figure 4:
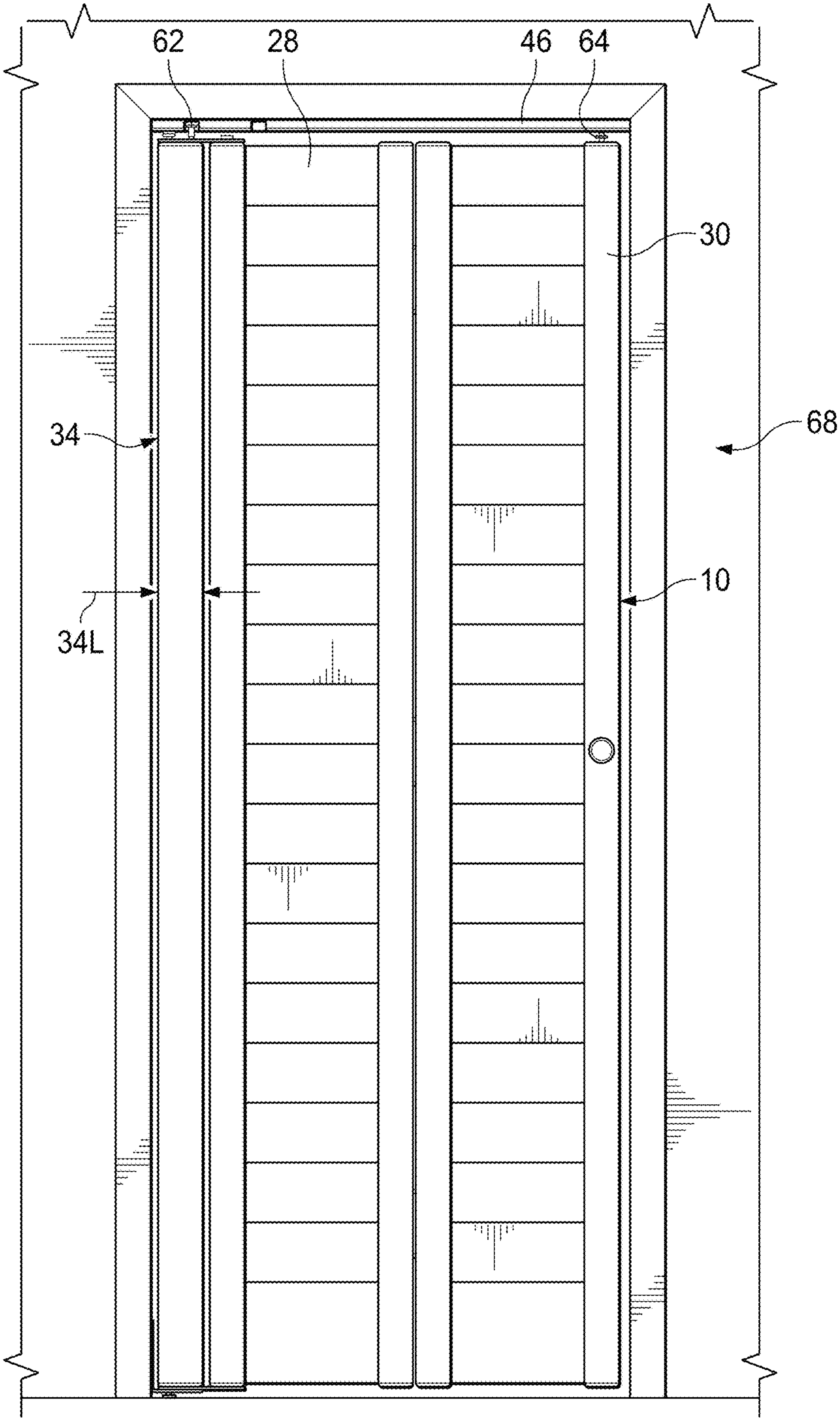
FIG. 4 is a front view of a folding door assembly in a doorway and in a full closed position according to one or more aspects of the disclosure.
Figure 5:
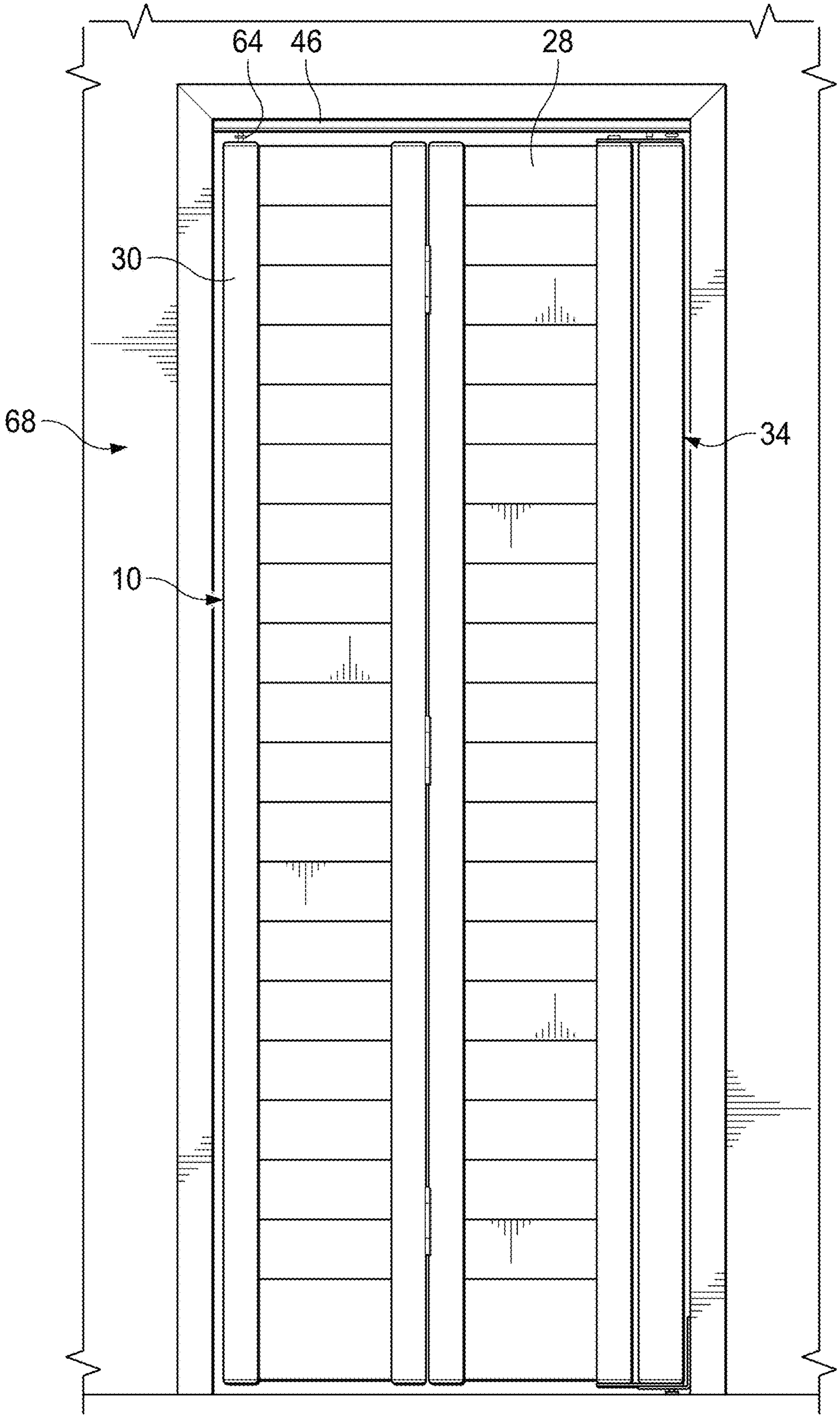
FIG. 5 is a rear view of the folding door assembly of FIG. 4.
Figure 14:
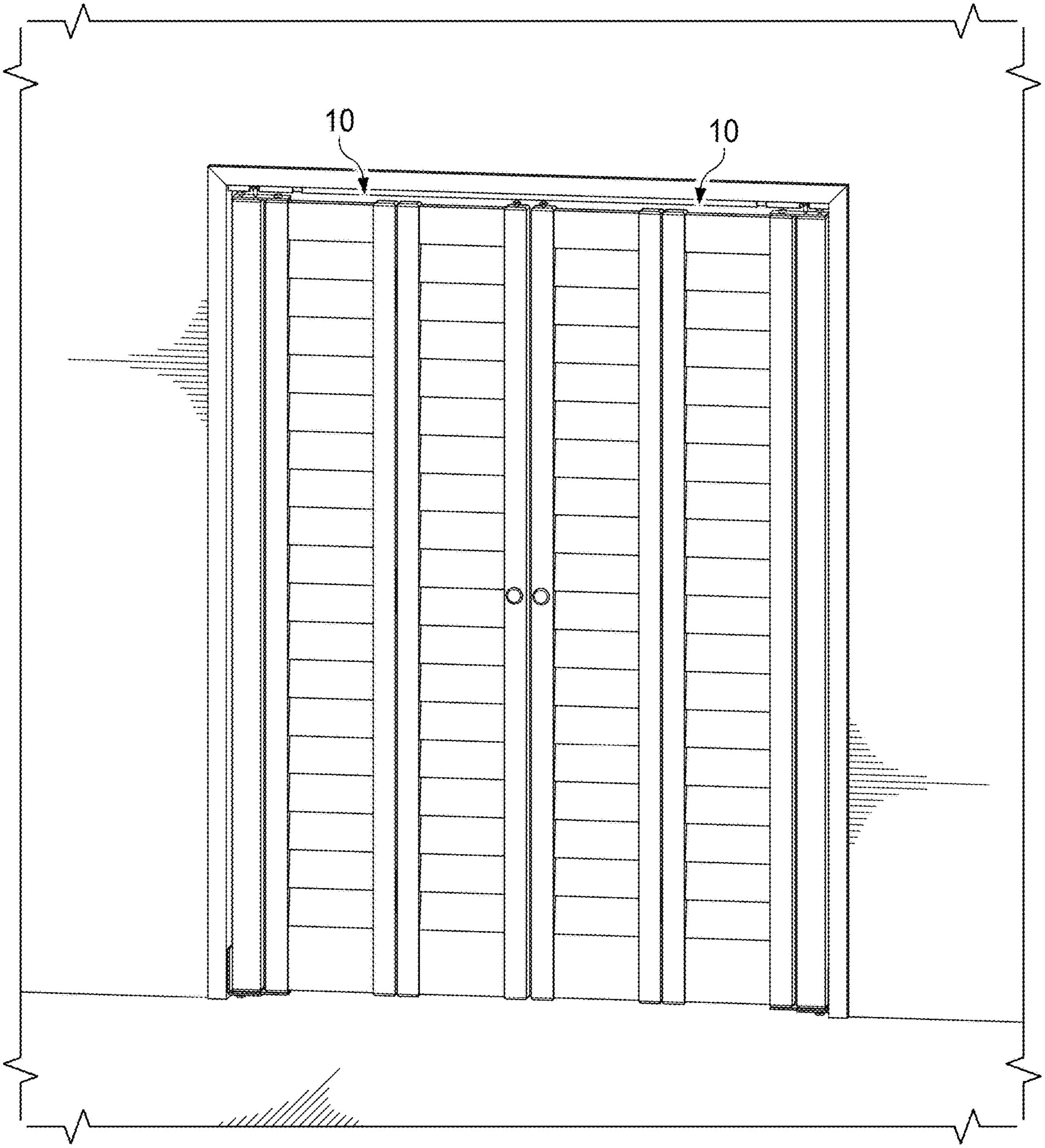
FIG. 14 illustrates two folding door assemblies each in a full closed position.

FIGS. 4, 5 and 14 illustrate folding panel door assemblies 10 installed in doorways and in a full closed position 68. Extension 34 and folding panel door 26 are fully extended and coaxially aligned along the plane of the doorway. Extension guide 62 is located through first opening and inside of the track slot. Door guide 64, which extends from the top wall of the distal end of the door assembly, is also positioned inside of track slot. FIG. 14 illustrates two folding panel door assemblies 10 in the full closed position.

Figure 6:
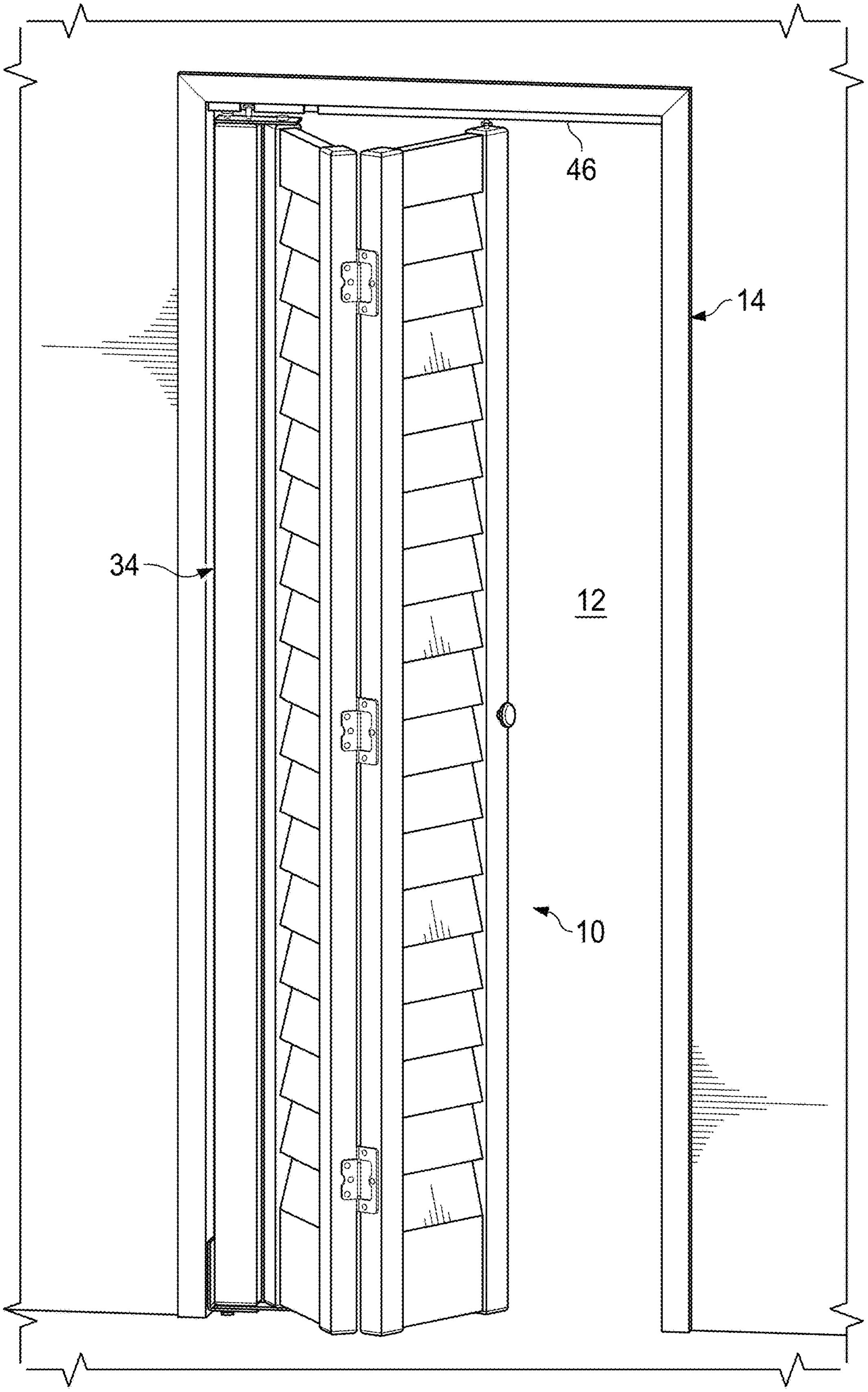
FIG. 6 illustrates a folding door assembly in a transition position between a full closed position and a first open position according to one or more aspects of the disclosure.
Figure 7:
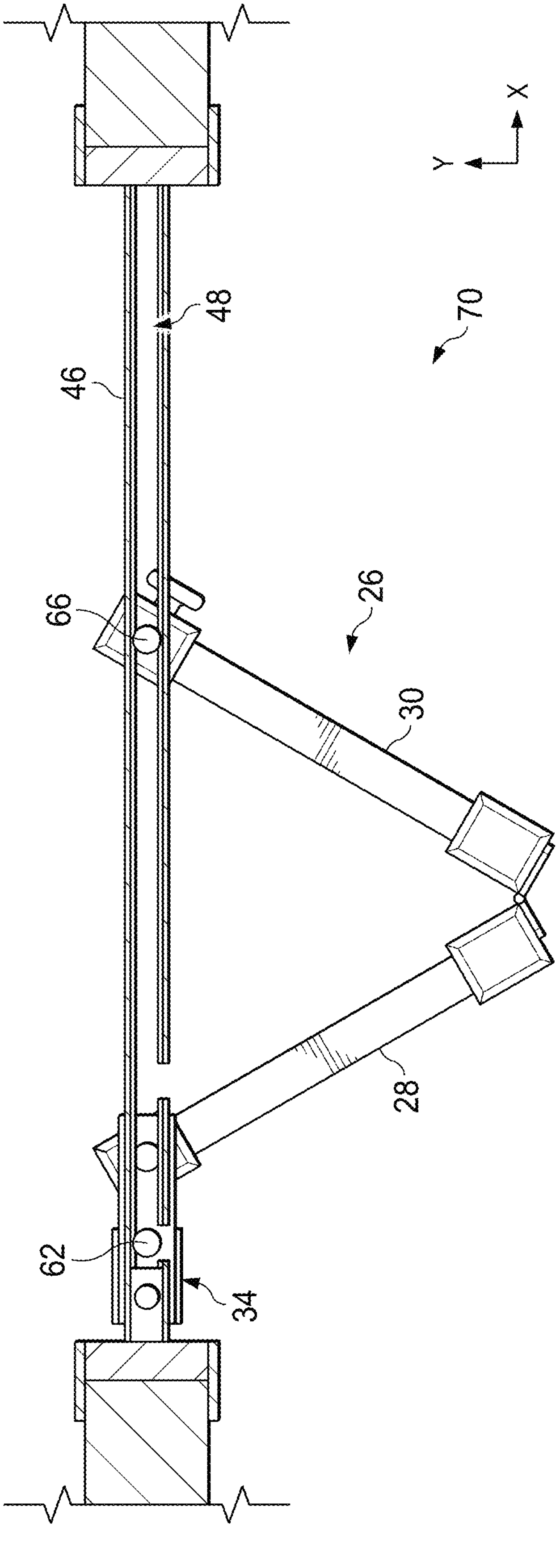
FIG. 7 is a top, cut-away view of the folding door assembly of FIG. 6 with the doorway header removed.
Figure 8:
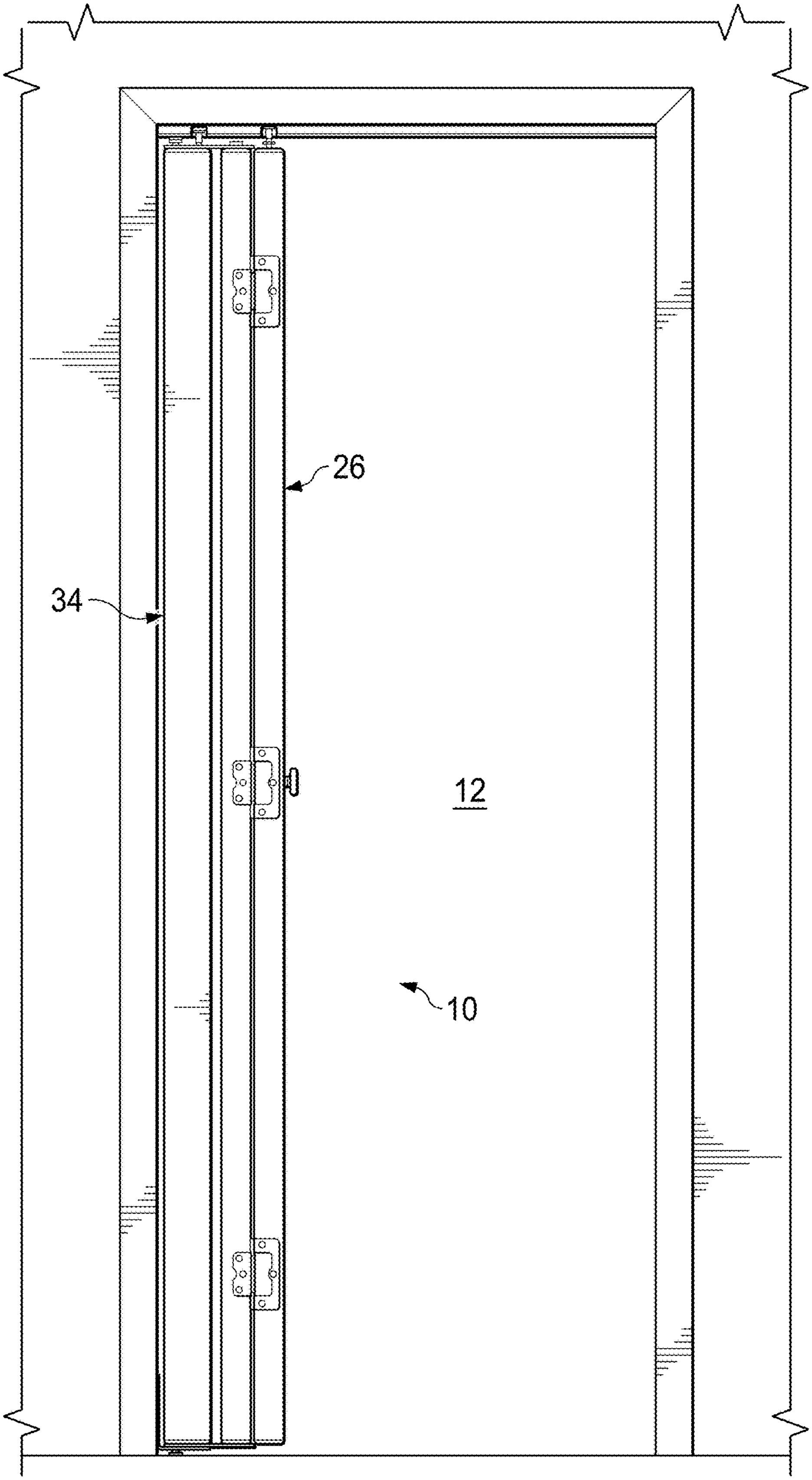
FIG. 8 illustrates a folding door assembly in a first open position according to one or more aspects of the disclosure.
Figure 9:
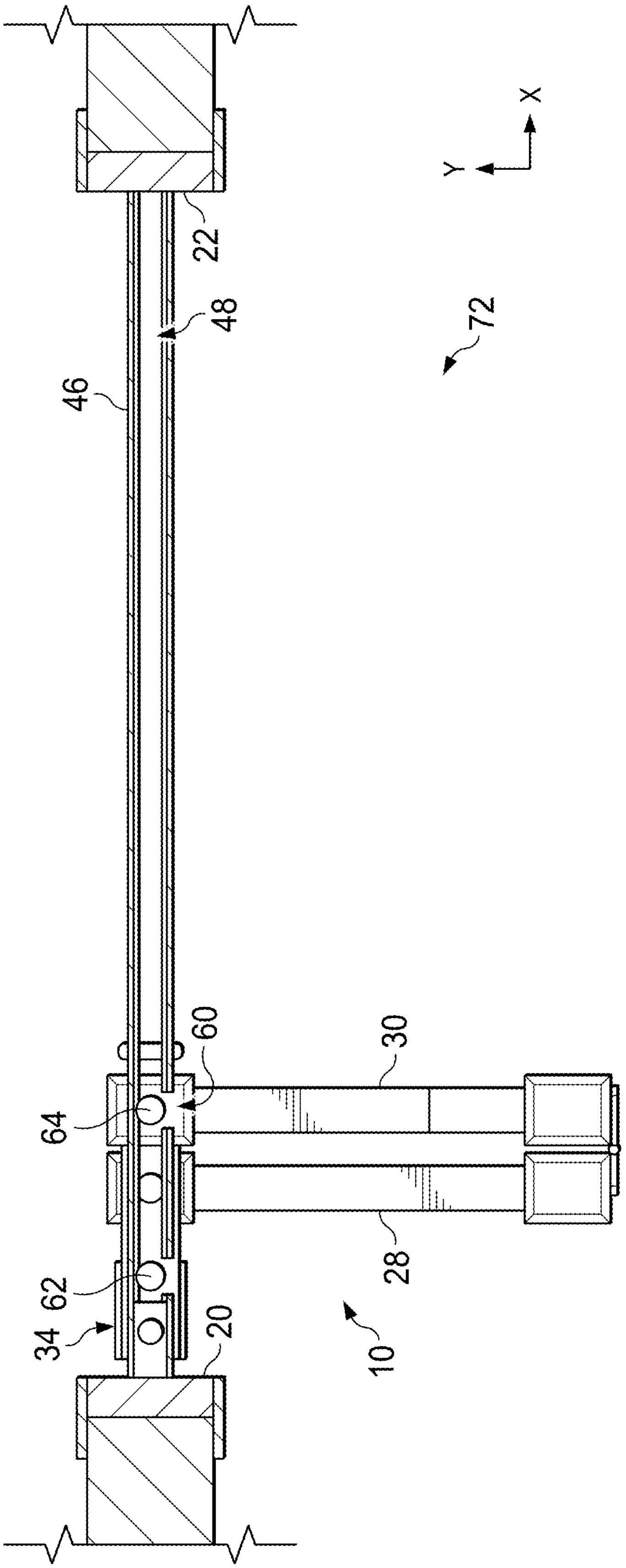
FIG. 9 is a top, cut-away view of the folding door assembly of FIG. 8 with the doorway header removed.

FIGS. 6 and 7 illustrate a door assembly 10 in a transition position 70 between full closed position 68 shown in FIGS. 4, 5 and 14, and a first open position 72 shown in FIGS. 8 and 9. Extension guide 62 and door guide 64 are located in track slot 48. Folding panel door 26 is moved toward extension 34 and is not coaxial with extension 34 (i.e., the extension length).

FIGS. 8 and 9 illustrate door assembly 10 in first open position 72. Extension 34 remains parallel to the vertical plane with extension guide 62 in track slot 48. Folding panel door 26 is folded back toward extension 34 whereby panels 28 and 30 are parallel to one another, the lateral axis Y, and to jambs 20, 22. Panels 28, 30 are positioned generally perpendicular to extension 34. Door extension 64 is located in slot 48 and at second opening 60.

Figure 10:
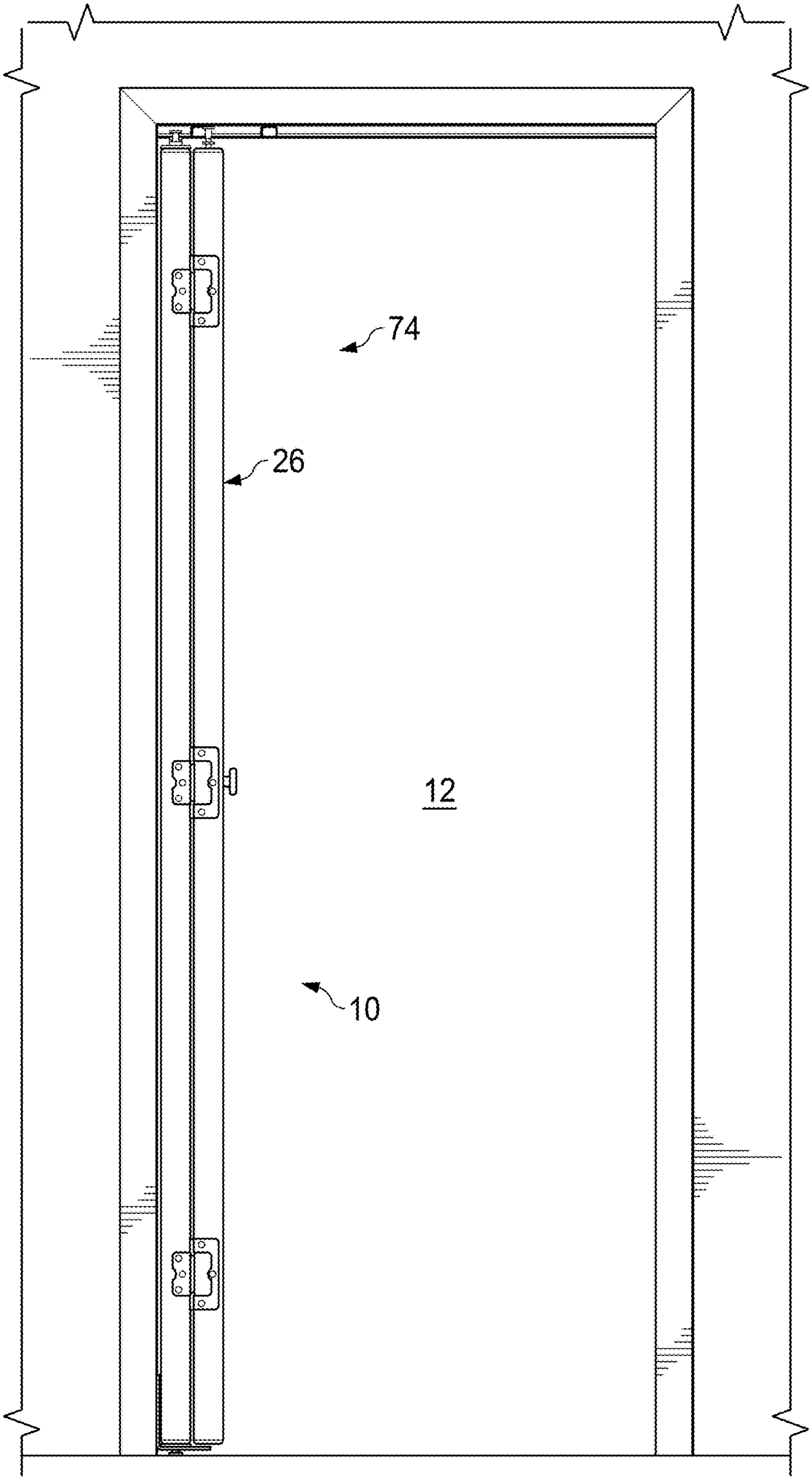
FIG. 10 illustrates a folding door assembly in a second open position according to one or more aspects of the disclosure.
Figure 11:
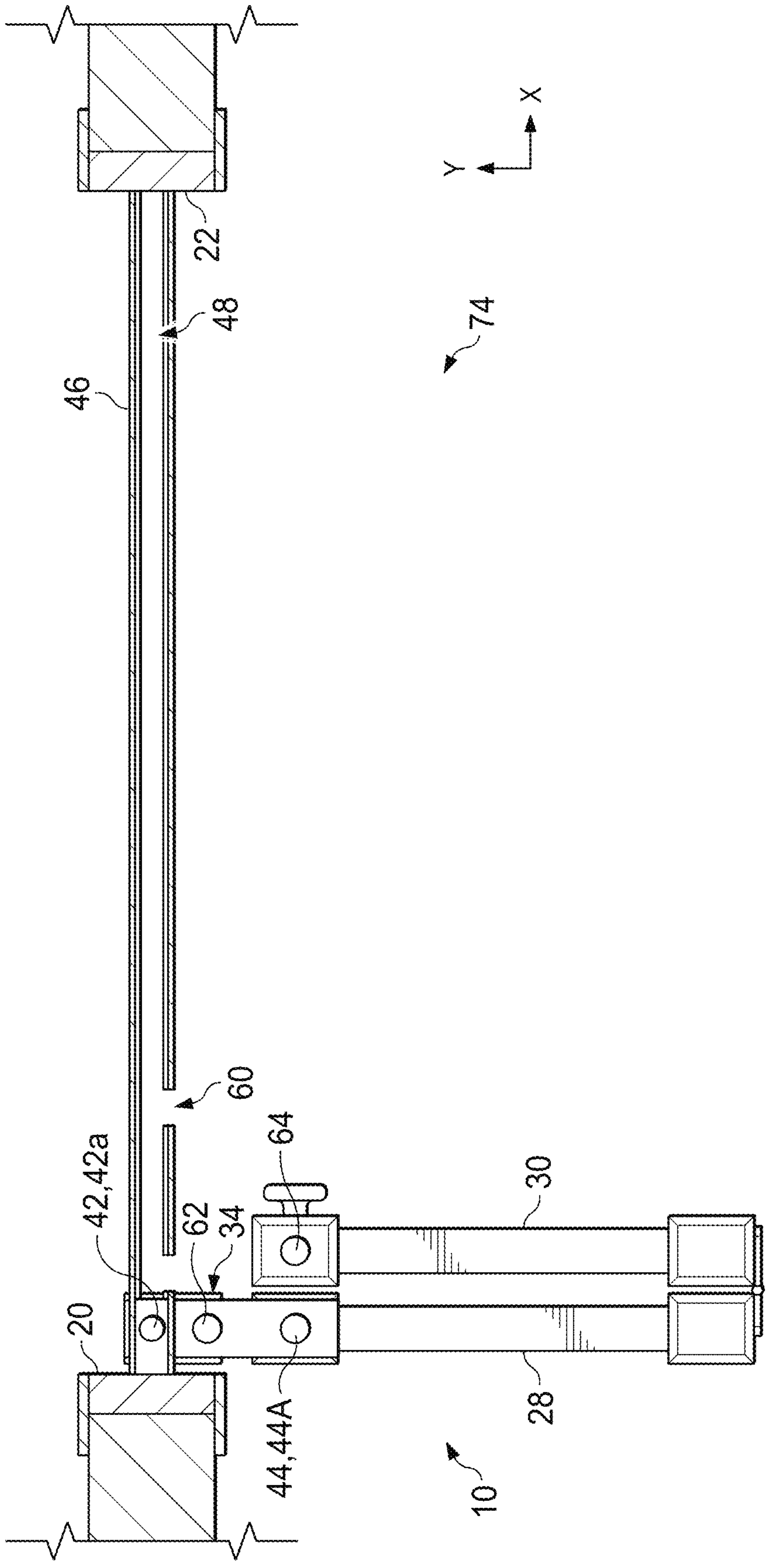
FIG. 11 is a top, cut-away view of the folding door assembly of FIG. 10 with the doorway header removed.

FIGS. 10 and 11 illustrate door assembly 10 in the second open position 74 exposing more of doorway 12 than is exposed with the door assembly in first open position 72. Extension 34 is rotated about pivot axis 42A of pivot connector 42, removing extension guide 62 from track slot 48, to a position generally parallel to lateral axis Y and jambs 20, 22 and perpendicular to the vertical plane of the doorway. Door panels 28 and 30 are rotated about pivot axis 44A of second pivot connector 44, passing door guide 64 through second opening 60 and removing door guide 64 from track slot 48, to a position parallel to extension 34, jambs 20, 22, and perpendicular to the vertical plane of the doorway. Door panels 28 and 30 are positioned generally parallel to each other and first panel 28 is coaxial with extension 34.

Figure 12:
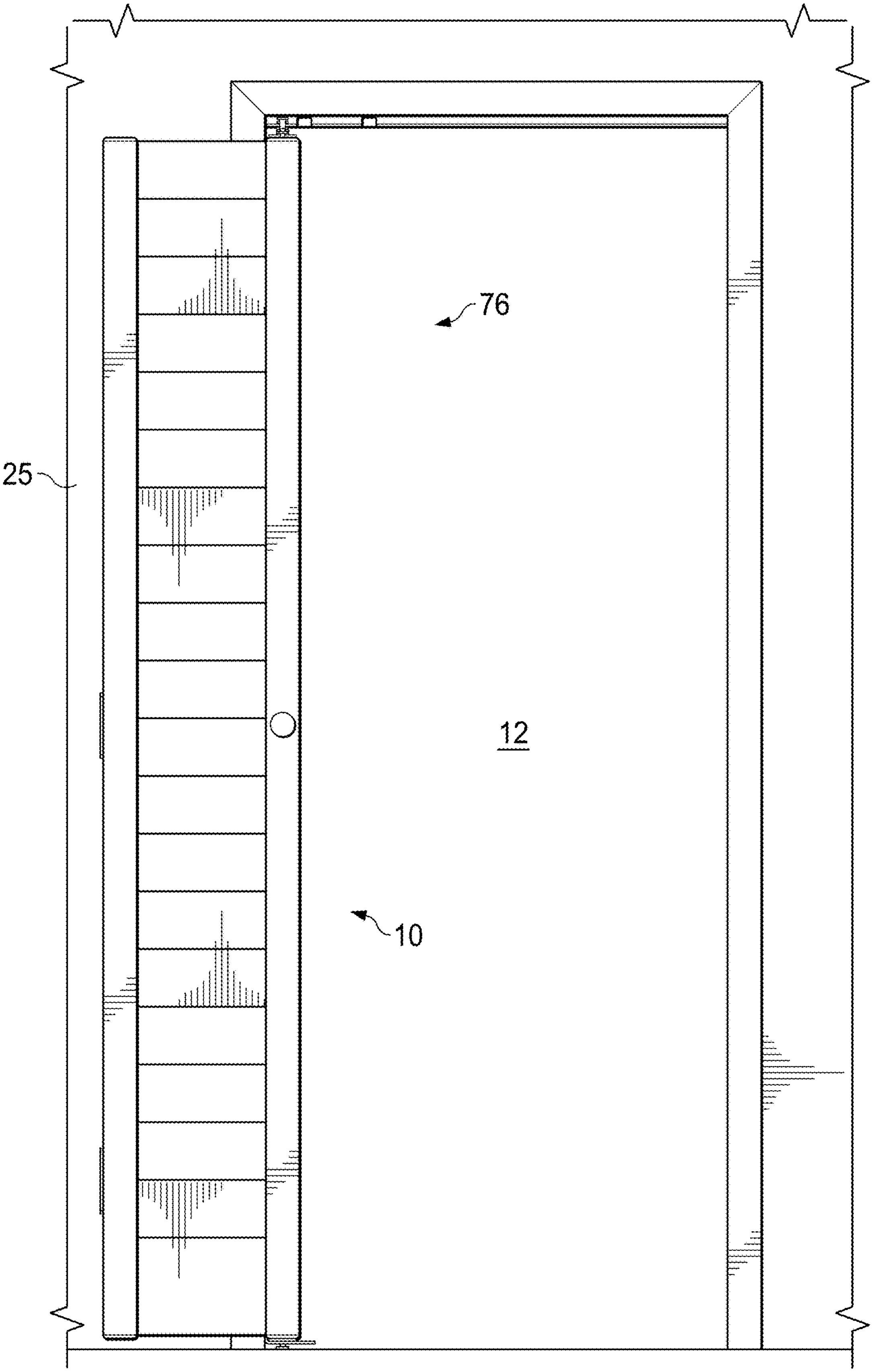
FIG. 12 illustrates a folding door assembly in a fully open position according to one or more aspects of the disclosure.
Figure 13:
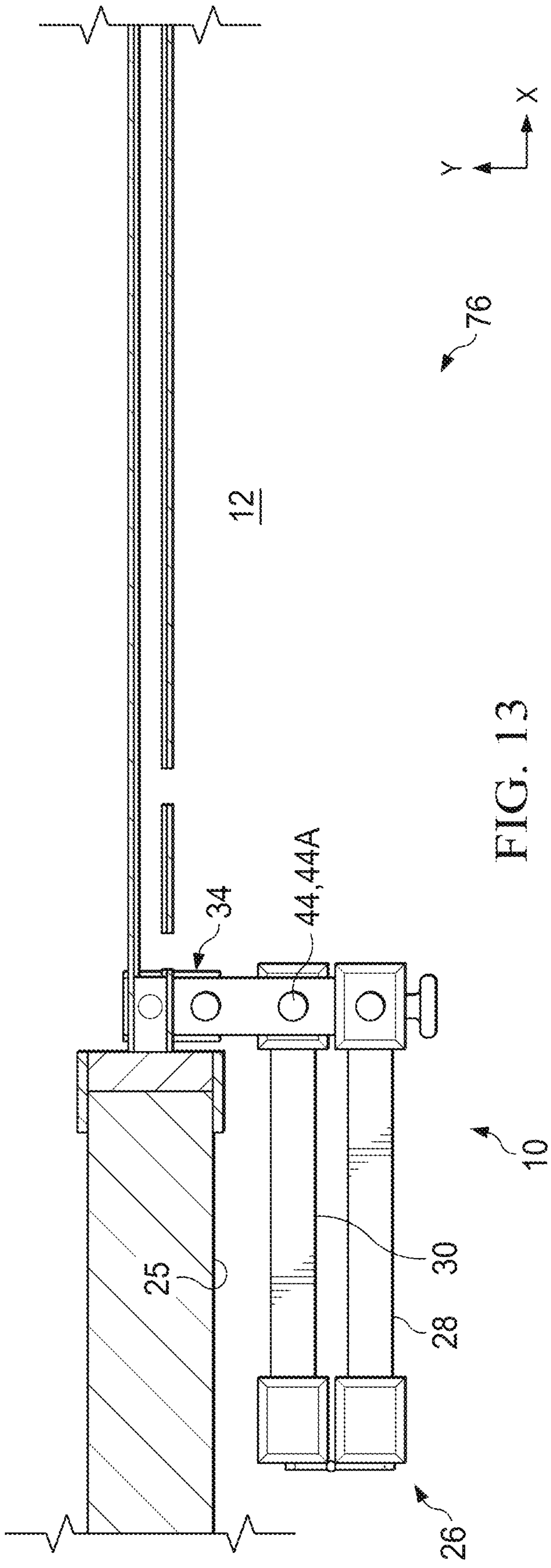
FIG. 13 is a top, cut-away view of the folding door assembly of FIG. 12 with the doorway header removed.
Figure 15:
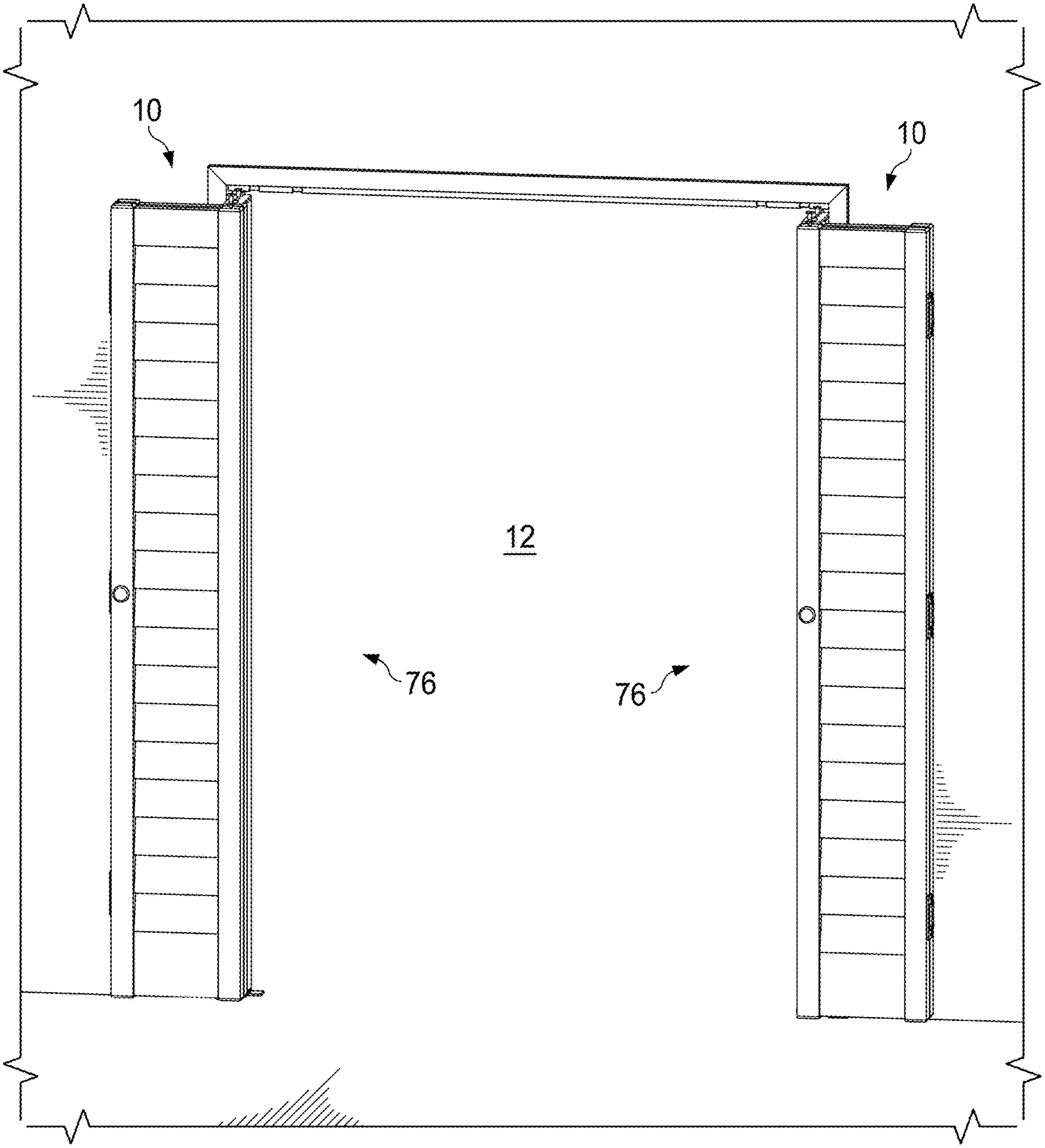
FIG. 15 illustrates two folding door assemblies each in a fully open position.

FIGS. 12, 13, and 15 illustrate door assemblies 10 in a fully open position 76 exposing more of doorway 12 than in the first and second open positions and exposing (opening) more of doorway 12 than is opened when a conventional folding panel door is fully opened. From the second open position, folding panel door 26 is rotated about pivot axis 44A of pivot connector 44 away from doorway 12. In the fully open position folding panel door 26 is positioned adjacent to wall space 25 with extension 34 between folding panel door 26 and doorway 12. Extension 34 is perpendicular to the vertical plane of the doorway and the longitudinal axis X and door panels 28, 30 are generally parallel to the longitudinal axis X.

A method of installation of a door assembly 10 and methods of operation of door assembly 10 are discloses with reference to FIGS. 1-15.

Although relative terms such as "outer," "inner," "upper," "lower," and similar terms have been used herein to describe a spatial relationship of one element to another, it is understood that these terms are intended to encompass different orientations of the various elements and components in addition to the orientation depicted in the figures. Furthermore, as used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. The terms "substantially," "approximately," "generally," and "about" are defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A door assembly for installation in a doorway defined by a frame, the doorway having a height between a header and a threshold and parallel to a vertical axis, a length between a first jamb and a second jamb and parallel to a longitudinal axis, the vertical axis and the longitudinal axis defining a vertical plane of the doorway between the first jamb and the second jamb, and a depth parallel to a lateral axis and perpendicular to the vertical plane, comprising:

a folding panel door comprising a first panel moveably attached to a second panel;

an extension having a top wall, an inside edge and outside edge parallel to the vertical axis, and an extension length between the inside edge and the outside edge;

a first pivot connector to moveably attach the extension to the frame with the inside edge adjacent to the first jamb; and a second pivot connector to moveably attach the extension to the first panel:

wherein when connected to the frame the door assembly is moveable between a full closed position, a first open position, a second open position, and a fully open position;

wherein in the full closed position the extension length, the first panel, and the second panel are coaxial and parallel to the vertical plane;

wherein in the first open position the extension length is located in the doorway and generally parallel to the vertical plane, and the first panel and the second panel are generally perpendicular to the extension length and parallel to one another and to the lateral axis;

wherein in the second open position the extension length, the first panel, and the second panel are generally parallel to the lateral axis and parallel to each other; and wherein in the fully open position the extension length is generally parallel to the lateral axis, the first panel and the second panel are generally perpendicular to the lateral axis and the extension length, and the extension is located between the folding panel door and the doorway.

2. The door assembly of claim 1, wherein the first pivot connector is connectable between the top wall of the extension and the header.

3. The door assembly of claim 1, wherein the extension length is in a range of about 0.5 to 4.0 inches.

4. The door assembly of claim 1, wherein the extension length is in a range of about 0.5 to 3.0 inches.

5. The door assembly of claim 1, wherein the extension length is in a range of about 1 to 2.5 inches.

6. The door assembly of claim 1, further comprising:

a track to be attached to the header, the track having a first end and a second end, a fore wall and an aft wall, a slot between the fore wall and the aft wall, and a first opening in the fore wall proximate to the first end and a second opening in the fore wall proximate to the first opening;

an extension guide to be attached to the extension proximate to the outside edge and to extend above the top wall of the extension, the extension guide positioned in the slot via the first opening when the door assembly is in the full closed position and the first open position; and a door guide to be attached to a top wall of the second panel, the door guide positioned in the slot via the second opening when the door assembly is in the full closed position and the first open position.

7. The door assembly of claim 6, wherein the extension length is in a range of about 0.5 to 4.0 inches.

8. The door assembly of claim 6, wherein the extension length is in a range of about 0.5 to 3.0 inches.

9. The door assembly of claim 6, wherein the extension length is in a range of about 1 to 2.5 inches.

10. A folding panel door assembly, comprising:

a doorway defined by a frame, the doorway having a height between a header and a threshold and parallel to a vertical axis, a length between a first jamb and a second jamb and parallel to a longitudinal axis, the vertical axis and the longitudinal axis defining a vertical plane of the doorway between the first jamb and the second jamb, and a depth parallel to a lateral axis that is perpendicular to the vertical plane;

a door assembly comprising a folding panel door and an extension, the folding panel door having a first panel moveably attached to a second panel and the extension having a top wall, an inside edge and outside edge parallel to the vertical axis, and an extension length between an inside edge and an outside edge;

a first pivot connector having a first vertical pivot axis attaching the extension to the frame with the inside edge adjacent to the first jamb; and a second pivot connector having a second vertical pivot axis attaching the extension to the first panel:

wherein the door assembly is moveable between a full closed position, a first open position, a second open position, and a fully open position;

wherein in the full closed position the extension length, the first panel, and the second panel are coaxial and parallel to the vertical plane;

wherein in the first open position the extension length is generally parallel to the vertical plane, and the first panel and the second panel are generally perpendicular to the extension length and generally parallel to one another and to the lateral axis;

wherein in the second open position the extension length, the first panel, and the second panel are generally parallel to the lateral axis and to each other; and wherein in the fully open position the extension length is generally parallel to the lateral axis, the first panel and the second panel are generally perpendicular to the lateral axis and the extension length, and the extension is located between the folding panel door and the doorway.

11. The folding panel door assembly of claim 10, wherein the first pivot connector is connected to the header and the top wall of the extension.

12. The folding panel door assembly of claim 10, wherein the extension length is less than the depth of the frame.

13. The folding panel door assembly of claim 10, wherein the extension length and the first panel are coaxial in the second open position.

14. The folding panel door assembly of claim 10, wherein the extension length is in a range of about 0.5 to 4.0 inches.

15. The folding panel door assembly of claim 10, wherein the extension length is in a range of about 1 to 2.5 inches.

16. The folding panel door assembly of claim 10, further comprising:

a track attached to the header, the track having a first end located adjacent to the first jamb and a second end, a fore wall and an aft wall, a slot between the fore wall and the aft wall, and a first opening in the fore wall proximate to the first end and a second opening in the fore wall proximate to the first opening;

an extension guide attached to the extension proximate to the outside edge and extending above the top wall of the extension, the extension guide positioned in the slot via the first opening; and a door guide to be attached to a top wall of the second panel, the door guide positioned in the slot via the second opening.

17. The folding panel door assembly of claim 16, wherein the extension length is less than the depth of the frame.

18. The folding panel door assembly of claim 16, wherein:

the extension guide and the door guide are located in the slot when the door assembly is in the full closed position and the first open position; and the extension guide and the door guide are removed from the slot when the door assembly is in the second open position and the fully open position.

19. The folding panel door assembly of claim 18, wherein the extension length is less than the depth of the frame.

20. The folding panel door assembly of claim 19, wherein the extension length and the first panel are coaxial in the second open position.

* * * * *